(12) United States Patent
Vance

(10) Patent No.: US 9,176,364 B2
(45) Date of Patent: Nov. 3, 2015

(54) DEPLOYABLE STORABLE MIRROR

(71) Applicant: Dan Vance, San Diego, CA (US)

(72) Inventor: Dan Vance, San Diego, CA (US)

( * ) Notice: Subject to any disclaimer, the term of this patent is extended or adjusted under 35 U.S.C. 154(b) by 0 days.

(21) Appl. No.: 14/447,491

(22) Filed: Jul. 30, 2014

(65) Prior Publication Data

US 2015/0062416 A1 Mar. 5, 2015

Related U.S. Application Data

(60) Provisional application No. 61/959,520, filed on Aug. 27, 2013, provisional application No. 61/965,563, filed on Feb. 3, 2014.

(51) Int. Cl.
*H04N 5/225* (2006.01)
*G03B 17/17* (2006.01)
*G03B 17/56* (2006.01)
*G03B 11/04* (2006.01)

(52) U.S. Cl.
CPC .............. *G03B 17/17* (2013.01); *G03B 11/045* (2013.01); *G03B 17/565* (2013.01); *H04N 5/2254* (2013.01)

(58) Field of Classification Search
CPC ..................................................... H04N 5/2252
USPC .................................................. 348/373, 375
See application file for complete search history.

(56) References Cited

U.S. PATENT DOCUMENTS

| | | | |
|---|---|---|---|
| 5,289,215 A * | 2/1994 | Clairmont et al. ............ | 352/243 |
| 8,054,379 B2 * | 11/2011 | Yuan .............................. | 348/376 |
| 2002/0067426 A1 * | 6/2002 | Nagata et al. ................. | 348/373 |
| 2003/0181225 A1 * | 9/2003 | Hasegawa et al. ............ | 455/566 |
| 2011/0081946 A1 * | 4/2011 | Singh ......................... | 455/556.1 |
| 2012/0327296 A1 * | 12/2012 | Kim .............................. | 348/373 |

* cited by examiner

*Primary Examiner* — Anthony J Daniels
(74) *Attorney, Agent, or Firm* — Michael R. Shevlin

(57) ABSTRACT

Disclosed are devices, systems, and methods for a view-changing mirror for use with an imaging or image-recording device, including a mirror assembly having a mirror configured to move between a stored position and a deployed position, wherein in the stored position the mirror is proximate the imaging or image-recording device and in the deployed position the direction of view is not oriented in the same direction as a subject being viewed in the imaging or image-recording device.

5 Claims, 8 Drawing Sheets

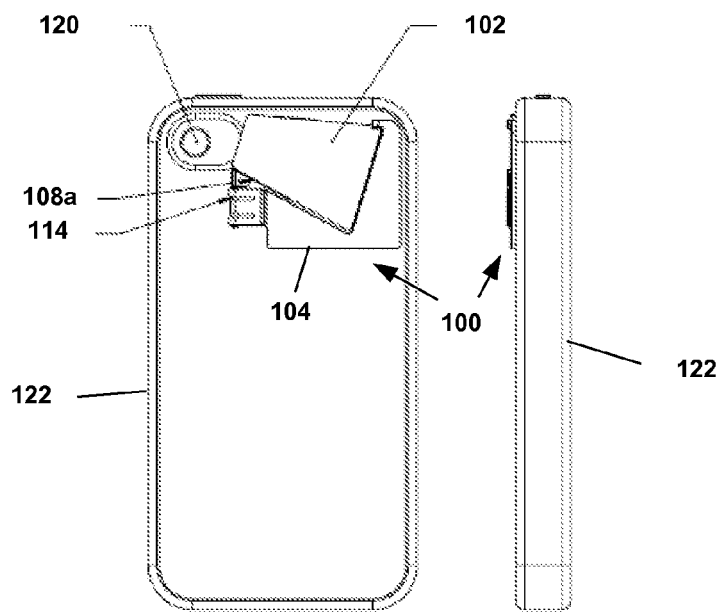
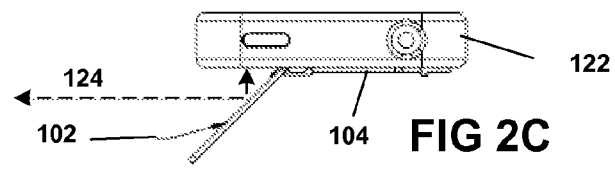
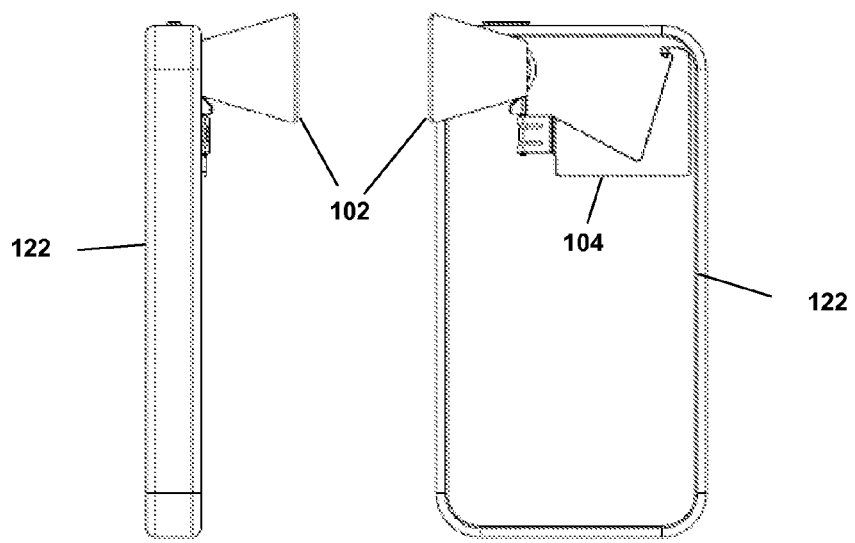
FIG 1A   FIG 1B
FIG 2B   FIG 2A

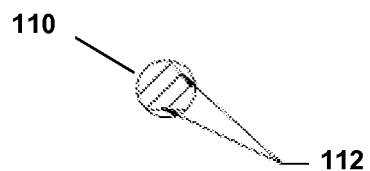
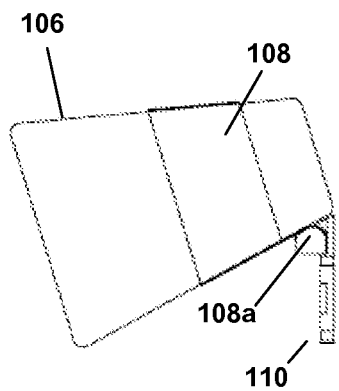
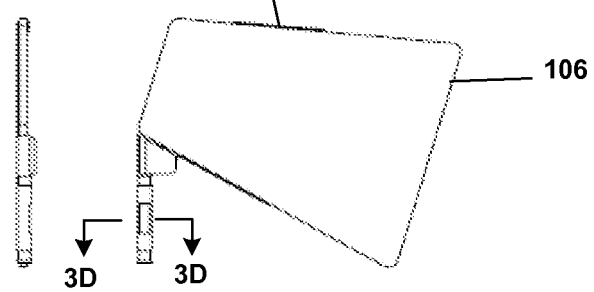
FIG 3D
FIG 3B    FIG 3C    FIG 3A
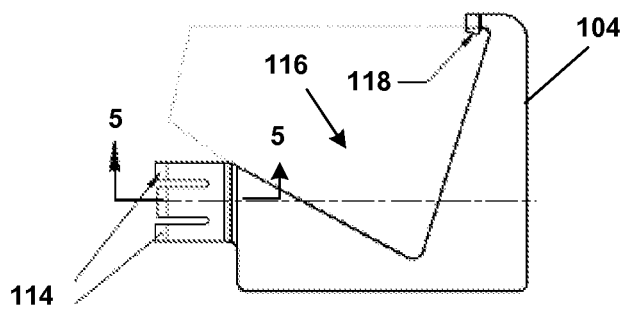
FIG 4
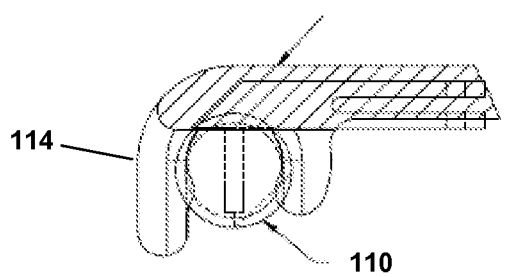
FIG 5

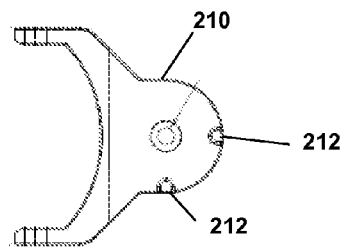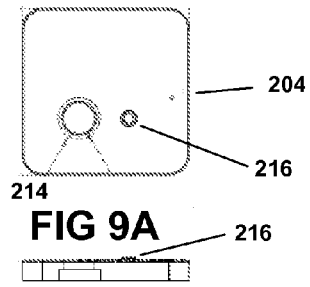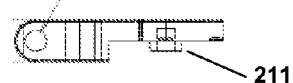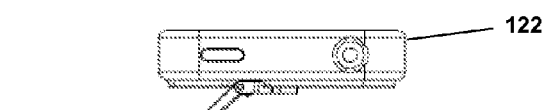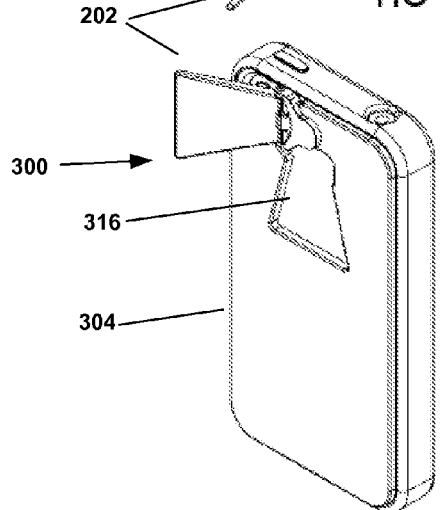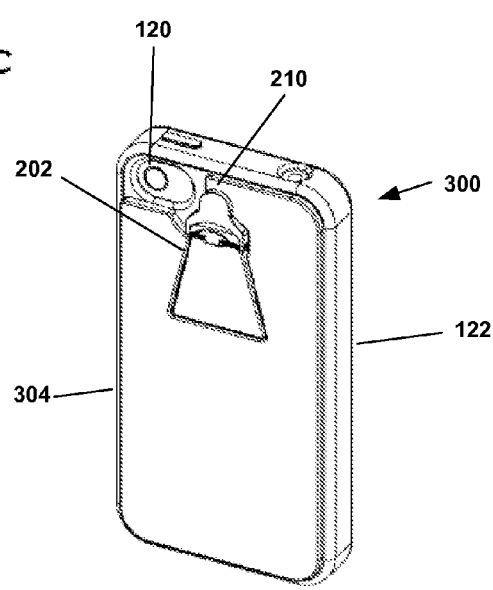

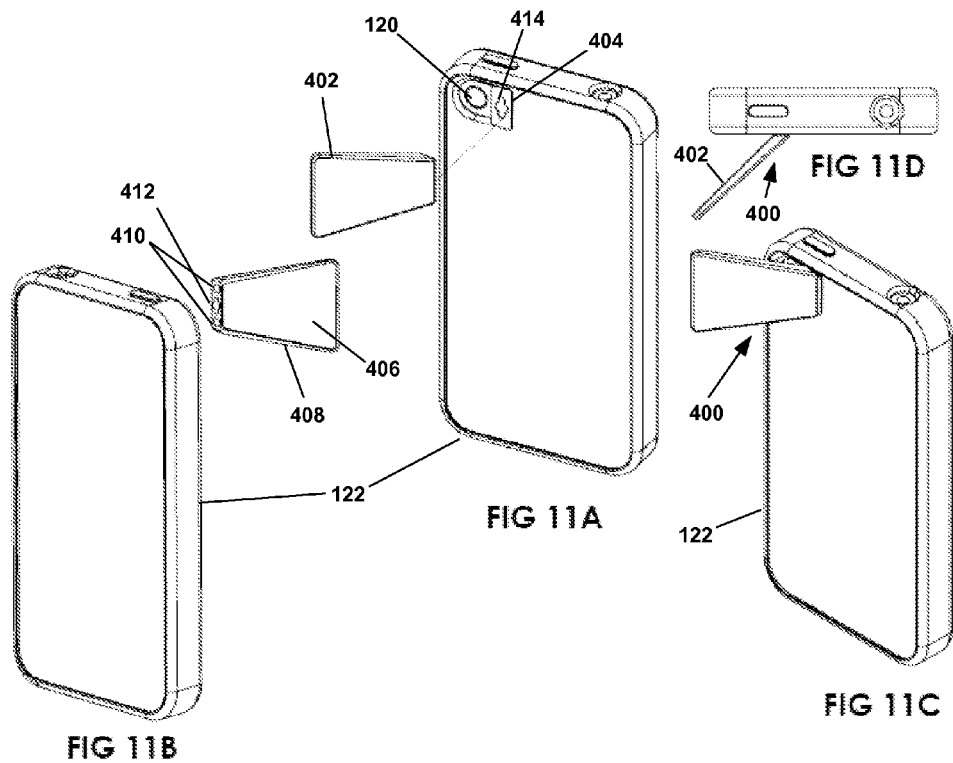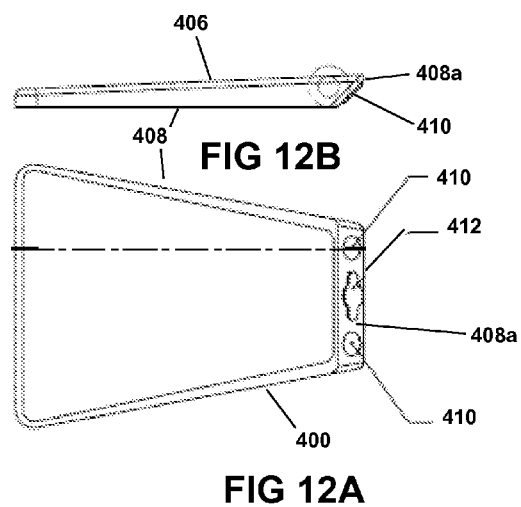

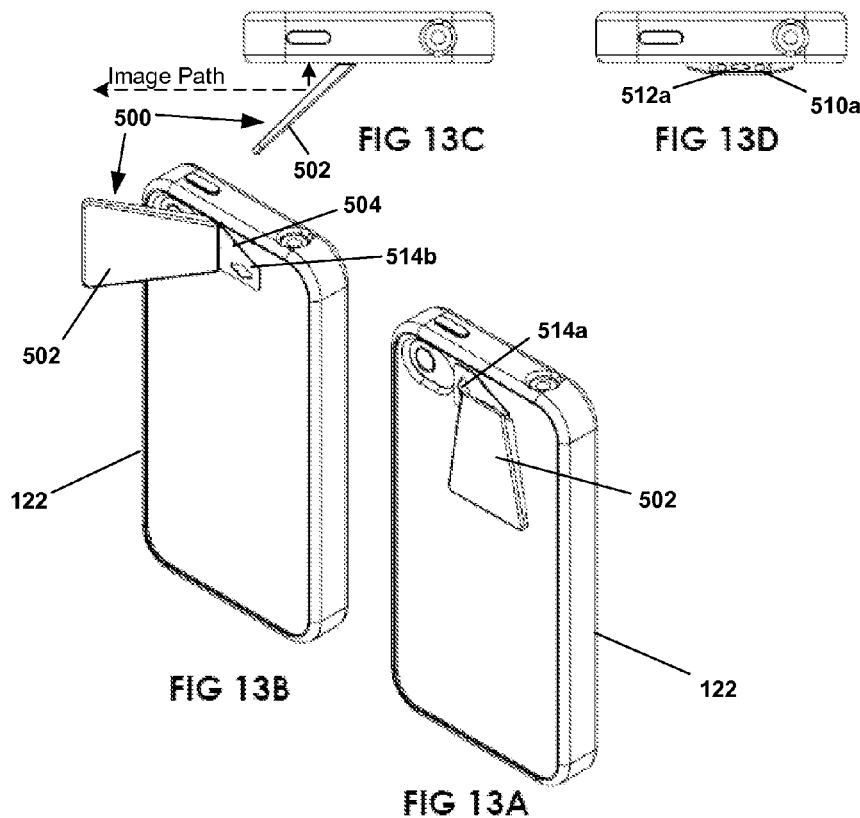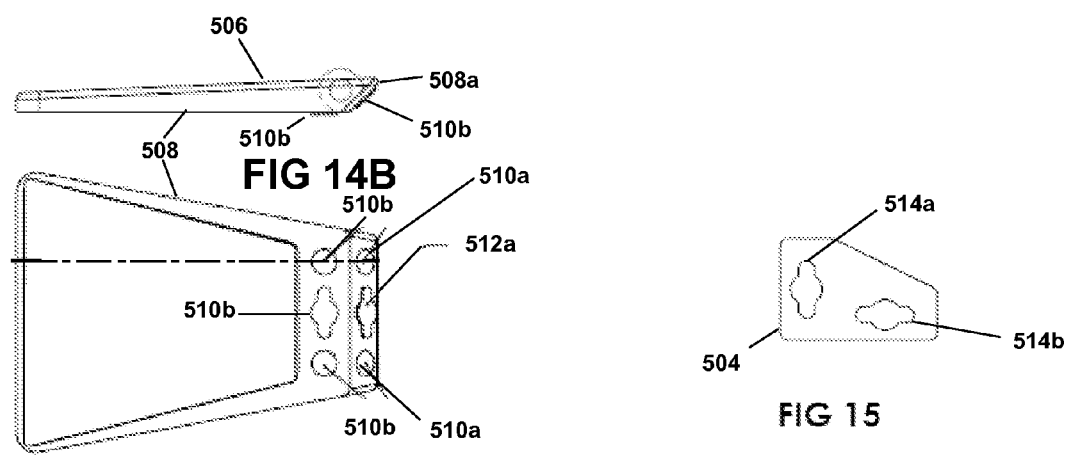

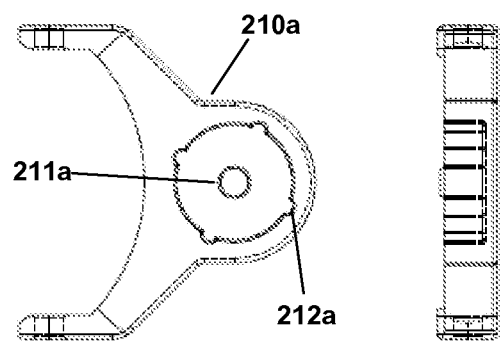
FIG 18A     FIG 18B
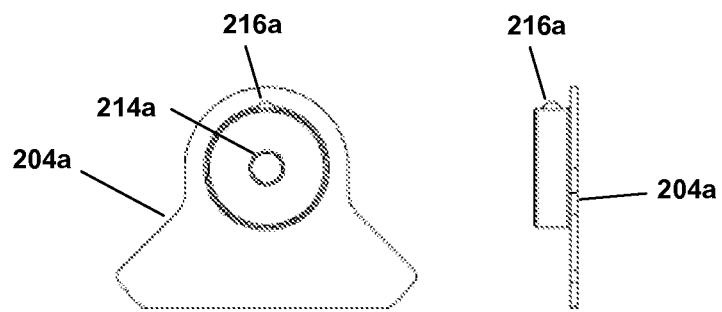
FIG 19A     FIG 19B

DEPLOYABLE STORABLE MIRROR

CROSS-REFERENCE TO RELATED APPLICATIONS

This application claims the benefit of U.S. Provisional Application No. 61/959,520, filed Aug. 27, 2013, and U.S. Provisional Application No. 61/965,563, filed Feb. 3, 2014, which are incorporated herein by reference.

FIELD

The present invention is generally related to deployable storable mirror elements for use with an imaging or image-recording device to change the optical direction of view or image path.

BACKGROUND

In using an imaging or image-recording device, such as a camera, to view or record still or moving images it is sometimes advantageous to change the direction of view or image path so that the capturing device is not oriented in the same direction as the subject being viewed, but is, for example, perpendicular to the direction of the subject being viewed. A way of achieving this change in optical direction is through the incorporation of a mirror element.

This is useful in many and varied ways. The following examples describe the mirror element as used with the camera of various imaging and image-recording devices:

The mirror enables taking a photo or video without calling attention to oneself or the subject;
  It allows using a camera, such as a smartphone camera, in situations that are normally constrained by the size of the smartphone and the position of its camera, such as using the camera to assist with hanging a picture on a wall, where the mirror element can enable "seeing" behind the picture from the edge, while the person hanging the picture can view the hanger on the smartphone display and properly position the picture on the hanger; or, using the camera when working on the engine of a car, where the smartphone display can be viewed by the mechanic while positioning the smartphone/mirror to view objects that are blocked from direct viewing because of their location in the engine compartment;
  It allows a person to view or record a potentially dangerous scene while protected from the danger by a barrier—only the mirror element needs to be clear of the barrier, while the person can view the scene on the camera display or monitor. For example, with the invention installed on a smartphone, a news reporter in a war-zone behind a wall of sandbags, with shooting going on, can deploy the mirror element and hold the smartphone so that the mirror is just past the edge of the barrier, allowing the reporter to view or record the scene on the smartphone display, risking only the mirror device and possibly the smartphone.

In view of this, it would be desirable to develop a mirror element that can be easily and quickly deployed, and that the mirror element is compact and unobtrusive in both the deployed and the undeployed positions.

SUMMARY

In one aspect, the invention is a view-changing mirror for use with an imaging or image-recording device, including a mirror assembly having a mirror configured to move between a stored position and a deployed position, wherein in the stored position the mirror is proximate the imaging or image-recording device and in the deployed position the direction of view is not oriented in the same direction as a subject being viewed by the imaging or image-recording device.

In some aspects, the mirror is coupled to a platform attached to the imaging or image-recording device.

In some aspects, the mirror assembly includes a hinge axle rotatably coupled to an integral hinge in the platform having a positional substantially-fixing means for maintaining the mirror in either the stored or deployed position.

In some aspects, the positional substantially-fixing means includes tangential flatted areas on the hinge axle, wherein the integral hinge exerts a mechanical force on the flatted areas to maintain the mirror in the stored or deployed position.

In some aspects, the platform includes a mirror retention feature configured to keep the mirror in the stored position.

In some aspects, the platform includes a cutout shape configured to store the mirror.

In some aspects, the deployed position the mirror is at an angle of 45° relative to the direction of view of the imaging or image-recording device, such that the field of view is 90° relative to the direction of view of the imaging or image-recording device.

In some aspects, the imaging or image-recording device is a smartphone, cellular phone, camcorder, including pro-video camera, SLR, DSLR, motion picture camera, Point & Shoot camera, iPad, iTouch, tablet PC, laptop, notebook PCs or other imaging or image-recording device.

In some aspects, the mirror is magnetically coupled to a platform attached to the imaging or image-recording device.

In some aspects, the mirror assembly includes a mirror coupled to a holder and a yoke, the holder being rotatably coupled to the yoke to allow the mirror to move up and down from the stored position to an open position, and the yoke being rotatably coupled to the platform to allow the holder and mirror to rotate from the stored position to the deployed position.

In some aspects, the holder and yoke includes positional substantially-fixing means wherein semi-cylindrical recesses in the inner circumference of the yoke are engaged and disengaged by means of a ball, said ball being urged into said recesses by means of a flexure, and said ball and said flexure being integral with the holder.

In another aspect, the invention is a view-changing mirror for use with a camera of an imaging or image-recording device including a mirror assembly having a mirror, and a platform coupled to the imaging or image-recording device having attachment means configured to removably couple with the mirror assembly, wherein when coupled, the mirror is at an angle relative to the direction of view of the camera.

In some aspects, the mirror is at an angle of 45° relative to the direction of view of the camera, such that the field of view is 90° relative to the direction of view of the camera.

In some aspects, the attachment means is one or more magnetic elements in the mirror assembly and one or more magnetically-attracting elements in the platform.

In some aspects, the mirror assembly and platform include mating keying features configured to keep the mirror in the desired position.

In some aspects, the desired position may be either a stored position or a deployed position.

In another aspect, the invention is a deployable mirror including a mirror element, a hinging means, a pivoting means, a positional fixing means, and a mounting platform element.

In some aspects, the deployable mirror is attached to a camera or other imaging or image-recording device.

In some aspects, the attachment means is adhesive.

In some aspects, the attachment means is mechanical.

In some aspects, the attachment means is one or more magnetic elements and one or more magnetically-attracting elements.

In some aspects, the deployable mirror is incorporated into, and is integral with, an imaging or image-recording device case.

BRIEF DESCRIPTION OF THE DRAWINGS

FIGS. 1A and 1B illustrate one embodiment of a deployable and storable mirror device configured to operate with an imaging or image-recording device, such as a camera of a smartphone in a stored position.

FIGS. 2A, 2B and 2C illustrate the embodiment of a deployable and storable mirror device of FIGS. 1A and 1B in a deployed position.

FIGS. 3A, 3B, 3C and 3D illustrate one embodiment of a mirror assembly for use with the mirror device of FIGS. 1A, 1B, 2A, 2B and 2C.

FIG. 4 is an orthogonal view of one embodiment of a hinge platform for use with the mirror device of FIGS. 1A, 1B, 2A, 2B and 2C.

FIG. 5 is a cross-sectional view of one embodiment of a hinge axle for use with the mirror device of FIGS. 1A, 1B, 2A, 2B and 2C.

FIGS. 8A and 8B illustrate top and side views of the yoke for use with the mirror device of FIGS. 6A, 6B and 6C.

FIGS. 9A and 9B illustrate top and side views of the platform or base for use with the mirror device of FIGS. 6A, 6B and 6C.

FIGS. 10A, 10B and 10C illustrate another embodiment of a deployable and storable mirror device configured to operate with an imaging or image-recording device, such as a camera of a smartphone.

FIGS. 11A, 11B, 11C and 11D illustrate an embodiment of a mirror element or assembly magnetically coupled to a base or holder configured to operate with an imaging or image-recording device, such as a camera of a smartphone.

FIGS. 12A and 12B illustrate rear and side views of the mirror element or assembly for use with the embodiment shown in FIGS. 11A, 11B, 11C and 11D.

FIGS. 13A, 13B, 13C and 13D illustrate another embodiment of a mirror element or assembly magnetically coupled to a base or holder configured to operate with an imaging or image-recording device, such as a camera of a smartphone. The mirror element or assembly may be magnetically coupled to the base in a stored or closed position or coupled to the base in a deployed position.

FIGS. 14A and 14B illustrate rear and side views of the mirror element or assembly with magnets and orienting or keying features for use with the embodiment shown in FIGS. 13A, 13B, 13C and 13D.

FIG. 15 illustrates a magnetic base or holder with orienting or keying features for use with the embodiment shown in FIGS. 13A, 13B, 13C and 13D.

FIGS. 18A and 18B illustrate top and side views of another embodiment of a yoke for use with the mirror device of FIGS. 6A, 6B and 6C.

FIGS. 19A and 19B illustrate top and side views of another embodiment of a platform or base for use with the mirror device of FIGS. 6A, 6B and 6C.

DETAILED DESCRIPTION

Figures 6A, 6B, 6C:
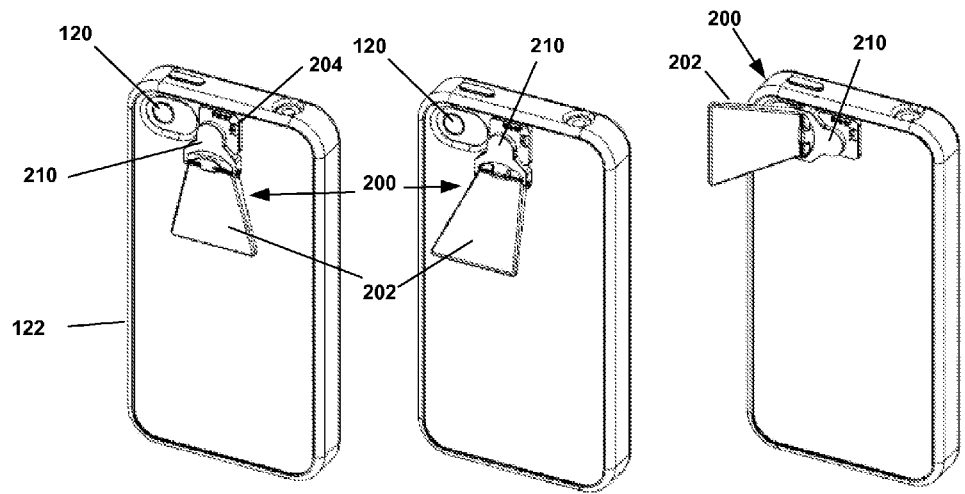
FIGS. 6A, 6B and 6C illustrate another embodiment of a deployable and storable mirror device configured to operate with an imaging or image-recording device, such as a camera of a smartphone.

Embodiments of the invention will now be described with reference to the figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

The disclosed invention is an innovative method and mechanism for deploying and storing a view-changing mirror element that can be easily and quickly deployed, and that the mirror element is compact and unobtrusive in both the deployed and the undeployed positions. In the embodiments described below, the mirror element is shown in operation with a smartphone as one of the possible uses of the invention, and there is no intention to limit the invention or exclude any other uses or embodiments of the invention. While the examples shown are with a smartphone, the invention may be coupled with any device to change the direction of view so that the capturing device is not oriented in the same direction as the subject being viewed.

FIGS. 1A, 1B, 2A, 2B and 2C shows one embodiment of a deployable and storable mirror device 100 configured to operate with an imaging or image-recording device to alter the direction of view or image path 124. The imaging or image-recording device may be a camera 120 of a smartphone 122, cellular phone, camcorder, including pro-video camera, SLR, DSLR, motion picture camera, Point & Shoot camera, iPad, iTouch, tablet PC, laptop, notebook PCs or other imaging or image-recording device. The mirror device 100 includes a mirror assembly 102 rotatably attached to a platform 104 affixed to the smartphone proximate the camera 120. The mirror assembly is configured to rotate between a stored or closed position, shown in FIGS. 1A, 1B, to a deployed or open position, shown in FIGS. 2A, 2B and 2C.

FIGS. 3A, 3B, 3C and 3D show the mirror assembly 102 that includes a mirror 106 coupled to a flexure/holder 108 and a hinge axle 110. The flexure/holder 108 includes a flexure portion 108a that allows the mirror 106 to move up and down slightly to engage a retention feature 118 of the platform 104, shown in FIG. 4, to hold the mirror in the stored or closed position. The hinge axle 110 consists of a primarily cylindrical axle with tangential flatted areas 112, shown in FIG. 3D, corresponding to the desired angular positions of the mirror in the deployed and stored positions.

The mirror may be any shape. In some embodiments, the mirror has a trapezoidal shape, which reduces size, weight and cost, and allows innovative deployment/storage options.

FIG. 4 is a perspective view of the hinge platform 104 having a cutout shape 116 for storage of the mirror, an integral hinge 114 and a retention feature 118.

FIG. 5 is a cross-sectional view of the hinge axle 110 coupled to the integral hinge 114. The integral hinge 114 exerts mechanical force on the flatted areas 112 the hinge axle 110, shown in FIG. 3D, corresponding to the desired angular positions of the mirror in deployed and stored positions, thereby maintaining the angular position of the mirror element once moved to either the stored or deployed position.

In use, the mirror element is deployed by releasing it from the stored position by pivoting it about the flexure/holder a short distance to clear the retention feature on the hinge platform 104, then rotating it at its hinge point to its deployed position established by the engagement of the flexing element with the flatted feature on the cylindrical hinge axle.

The mirror element is stored by reversing the deployment sequence, namely, by rotating the mirror element about the hinge point, and as it nears the stored position, pivoting it about the flexure to clear the retention feature, then continuing the rotation to the fully stored position, then releasing it from the flexure force to capture it under the retention feature.

In the preferred embodiment, in the deployed position the mirror element is at an angle of 45° relative to the plane of the camera imager, such that the field of view is 90° relative to the plane of the camera imager.

FIGS. 6A, 6B and 6C show another embodiment of a deployable and storable mirror device 200 configured to operate with a camera 120 of a smartphone 122, cellular phone, or other camera device. The mirror device 200 includes a mirror assembly 202 rotatably coupled, via a yoke 210, to a platform or base 204 affixed to the smartphone proximate the camera 120. The mirror assembly is configured to move from a stored or closed position, shown in FIG. 6A, to an open position, shown in FIG. 6B, and then rotated to a deployed position, shown in FIG. 6C.

Figure 7:
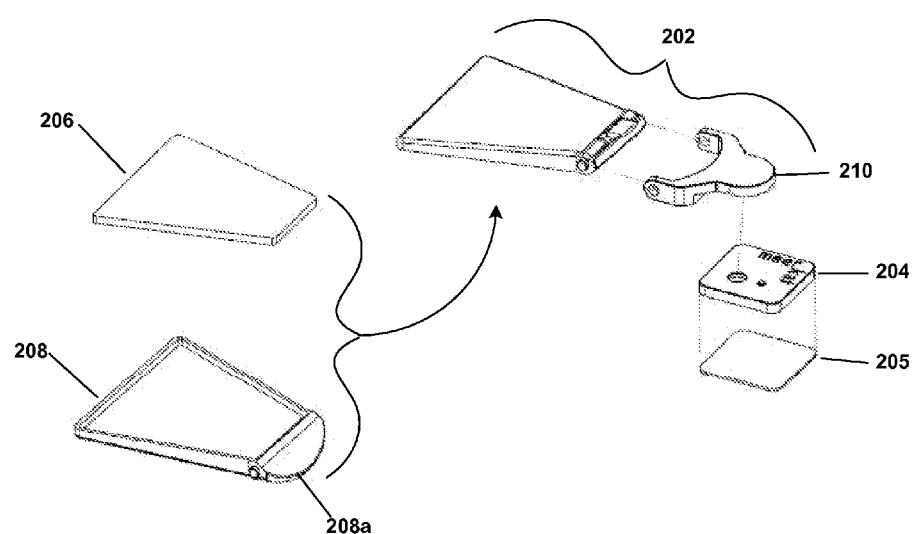
FIG. 7 illustrates an exploded view of a mirror assembly and base for use with the mirror device of FIGS. 6A, 6B and 6C.
Figure 16A:
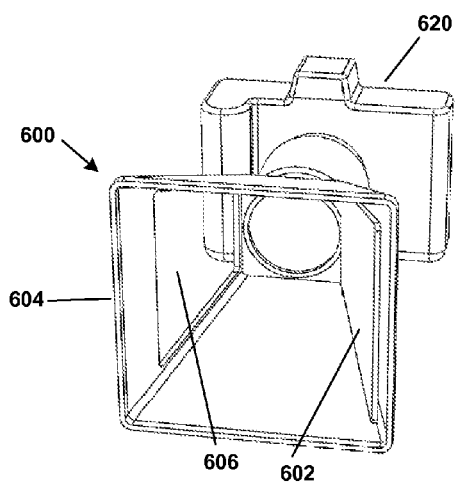
FIGS. 16A and 16B illustrate perspective and top views of another embodiment of a deployable and storable mirror device on an imaging or image-recording device, such as a SLR or DSLR camera in a stored position.
Figure 16B:
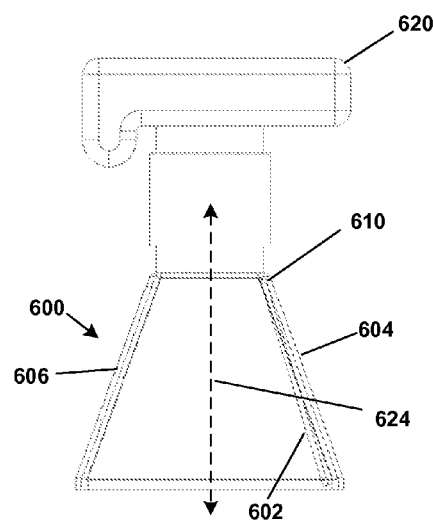
Figure 17A:
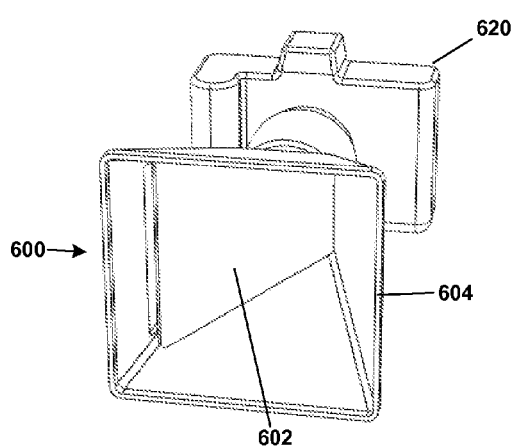
FIGS. 17A and 17B illustrate perspective and top views of the deployable and storable mirror device of FIGS. 16A and 16B in a deployed position.
Figure 17B:
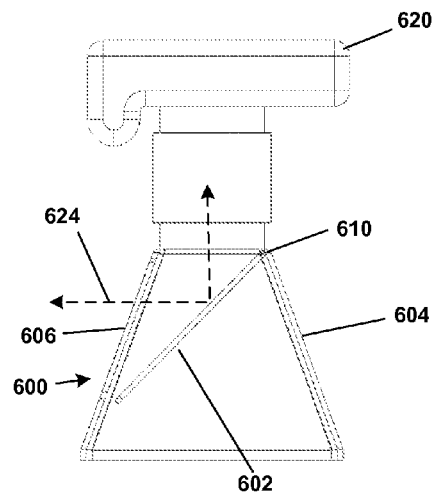

FIG. 7 shows an exploded view of the mirror assembly 202 and base 204. The mirror assembly 202 includes a mirror 206 coupled to a holder 208 and a yoke 210. The mirror 206 may be coupled to the holder 208 with an adhesive or other means. The holder 208 is rotatably coupled to the yoke 210 to allow the mirror 206 to move up and down from a stored or closed position to an open position, shown in FIG. 6B. The holder 208 may include a flatted area 208a that contacts the smartphone at the desired mirror angle when the mirror is in the open position. The mirror assembly 202 is rotatably coupled platform or base 204, via the yoke 210. In one embodiment, the platform or base 204 may be attached to the smartphone using a pressure sensitive adhesive 205.

FIGS. 8A and 8B show top and side views of the yoke 210 having a pin or axle 211 and detents or cavity areas 212 to couple with the platform or base 204.

FIGS. 9A and 9B show top and side views of the platform or base 204 having an opening 214 configured to rotatably couple with the axle 211, and protrusion 216 is configured to couple with the detents or cavity areas 212 when the mirror assembly is in the stored or deployed positions.

In use, the mirror assembly 202 is deployed from the stored position, as shown in FIG. 6A, by pivoting it away from the phone, disengaging the protrusion 216 from detent 212, as shown in FIG. 6B, and then rotating it to the deployed position and engaging detent 212 with protrusion 216, as shown in FIG. 6C. The mirror element is stored by reversing the deployment sequence.

In the preferred embodiment, in the deployed position the mirror element is at an angle of 45° relative to the plane of the camera imager, such that the field of view is 90° relative to the plane of the camera imager.

FIGS. 10A, 10B and 10C show another embodiment of a deployable and storable mirror device 300 configured to operate with a camera 120 of a smartphone 122, cellular phone, or other camera device. The mirror device 300 is similar to mirror device 200, utilizing mirror assembly 202 that is coupled to a larger platform or base 304, having the same features as base 204, with a cutout 316 sized to store the mirror assembly 202. In some embodiments, base 304 may be integrated into a smartphone case. The mirror assembly 202 is rotatably attached to platform or base 304 that is affixed to the smartphone proximate the camera 120. The mirror assembly is configured to move from stored or closed position, shown in FIG. 10A, to a deployed position, shown in FIGS. 10B, 10C.

FIGS. 11A-11D show a mirror device 400 having a mirror element or assembly 402 magnetically coupled to a base or holder 404. The mirror element or assembly 402 includes a mirror 406 attached to a holder or housing 408 having a flatted area 408a along one end that contacts the smartphone at the desired mirror angle when the mirror is in the open position. One or more magnets 410 are positioned on flatted area 408a. The flatted area 408a may also include an orienting or keying feature 412 configured to couple with an orienting or keying feature 414 on the base or holder 404, see FIGS. 12A and 12B. The base or holder 404 is made of a magnetically attractive element, such as a thin plate of magnetic material, affixed to the surface of a smartphone 122 in the location providing the desired position and orientation of the mirror element with respect to the smartphone camera 120.

In use, the mirror element 402 is magnetically attached to the base or holder 404. The orienting or keying feature 412 on the mirror element 402 match the orienting or keying feature 414 on the holder 404, which coax the mirror element 402 to a consistent, predefined position when the mirror element 402 is placed on the holder 404, shown in FIGS. 11C, 11D. The predefined position of the mirror element may be at an angle of 45° relative to the plane of the camera imager, such that the field of view is 90° relative to the plane of the camera imager, see FIG. 11D.

FIGS. 13A-13D show another embodiment of a mirror device 500 having a mirror element or assembly 502 magnetically coupled to a base or holder 504. The mirror assembly may be magnetically coupled to the base in a stored or closed position, shown in FIG. 13A, 13D, or magnetically coupled to the base in a deployed position, shown in FIGS. 13B, 13C. The mirror element or assembly 502 includes a mirror 506 attached to a holder or housing 508. FIGS. 14A, 14B show a rear and side view of the mirror element or assembly 502 having a flatted area 508a along one end that contacts the smartphone at the desired mirror angle when the mirror is in the open position. One or more magnets 510a are positioned on flatted area 508a, and one or more magnets 510b are positioned on a back surface 508b of the housing 508. The flatted area 508a and back surface 508b may also include orienting or keying features 512a, 512b. The base or holder 504 shown in FIG. 15 is made of a magnetically attractive element, such as a thin plate of magnetic material, affixed to the surface of a smartphone 122 in the location providing the desired position and orientation of the mirror element with respect to the smartphone camera 120. The base or holder 504 includes orienting or keying features 514a, 514b configured to couple with orienting or keying features 512a, 512b on the mirror element or assembly 502.

In use, the mirror element 502 is magnetically attached to the base or holder 504. The orienting or keying features 512a, 512b on the mirror element 502 match the orienting or keying features 514a, 514b on the holder 504, which coax the mirror element 502 to a consistent, predefined position when the mirror element 502 is placed on the holder 504. In one predefined position when keying feature 512a mates with keying features 514a, the mirror element may be at an angle of 45° relative to the plane of the camera imager, such that the field of view is 90° relative to the plane of the camera imager, shown in FIG. 13B. In another predefined position when keying feature 512b mates with keying features 514b, the mirror element may be in a stored position, shown in FIG. 13A.

While examples in the embodiments described above show the deployed position of the mirror element to be at a 45° angle relative to the plane of the camera imager and the field of view is 90° relative to the plane of the camera imager, it is contemplated that the mirror element may be at other angles relative to the plane of the camera imager and the field of view is may be at other angles relative to the plane of the camera imager.

FIGS. 16A, 16B, 17A, 17B show another embodiment of a view-changing mirror element that can be easily and quickly deployed, and that the mirror element is compact and unobtrusive in both the deployed and the undeployed positions. In this embodiment, a mirror device 600 having a mirror element or assembly 602 is rotatably coupled to a holder or matte-box-like attachment 604 of a SLR or DSLR camera 620. The mirror element or assembly 602 is configured to move or rotate between a stored position, shown in FIGS. 16A, 16B, to a deployed position, shown in FIGS. 17A, 17B. In the embodiment shown, the matte-box-like attachment 604 includes an opening 606 for direction of view or image path 624 when the mirror assembly 602 is in the open position. In some embodiments, the mirror element or assembly 602 may also include a hinge 610 having features to hold the mirror element or assembly 602 in the stored position or deployed position. In other embodiments, there may be magnetic elements coupled to the mirror element or assembly 602 and/or holder 604 hold the mirror element or assembly 602 in the stored position or deployed position.

FIGS. 18A and 18B illustrate top and side views of another embodiment of a yoke 210a for use with the mirror device of FIGS. 6A, 6B and 6C. he yoke 210a having a pin or axle 211a and detents or cavity areas 212a to couple with the platform or base 204a FIGS. 19A and 19B illustrate top and side views of another embodiment of a platform or base 204a for use with the mirror device of FIGS. 6A, 6B and 6C. The platform or base 204a having an opening 214a configured to rotatably couple with the axle 211a, and protrusion 216a is configured to couple with the detents or cavity areas 212a when the mirror assembly is in the stored or deployed positions.

It is intended that the specification and examples be considered as exemplary only, with a true scope and spirit of the invention being indicated by the following claims. In addition, where this application has listed the steps of a method or procedure in a specific order, it may be possible, or even expedient in certain circumstances, to change the order in which some steps are performed, and it is intended that the particular steps of the method or procedure claims set forth herebelow not be construed as being order-specific unless such order specificity is expressly stated in the claim.

The invention claimed is:

1. A view-changing mirror for use with an imaging or image-recording device comprising:
   a mirror assembly having a mirror configured to move between a stored position and a deployed position, wherein in the stored position the mirror is proximate the imaging or image-recording device and in the deployed position the direction of view is not oriented in the same direction as a subject being viewed in the imaging or image-recording device,
   wherein the mirror is coupled to a platform attached to the imaging or image-recording device,
   wherein the mirror assembly includes a mirror coupled to a holder and a yoke, the holder being rotatably coupled to the yoke to allow the mirror to move up and down from the stored position to an open position, and the yoke being rotatably coupled to the platform to allow the mirror to rotate from the open position to the deployed position.

2. The mirror of claim 1, wherein the platform includes a mirror retention feature configured to keep the mirror in the stored position.

3. The mirror of claim 1, wherein the platform includes a cutout shape configured to store the mirror.

4. The mirror of claim 1, wherein in the deployed position the mirror is at an angle of 45° relative to the direction of view of the imaging or image-recording device, such that the field of view is 90° relative to the direction of view of the imaging or image-recording device.

5. The mirror of claim 1, wherein the imaging or image-recording device is a smartphone, cellular phone, camcorder, including pro-video camera, SLR, DSLR, motion picture camera, Point & Shoot camera, iPad, iTouch, tablet PC, laptop, notebook PCs or other imaging or image-recording device.

* * * * *